US009566635B2

(12) United States Patent  (10) Patent No.: US 9,566,635 B2
Ochsenbein et al.  (45) Date of Patent: Feb. 14, 2017

(54) DEVICE AND METHOD FOR PREVENTING A TOOL FROM BREAKING WHEN FINE BLANKING AND/OR FORMING A WORKPIECE

(71) Applicant: Feintool International Holding AG, Lyss (CH)

(72) Inventors: Juerg Ochsenbein, Niederwanden bei Bern (CH); Alfio Christofaro, Reichenburg (CH); Hans-Rudi Honegger, Wolfhausen (CH)

(73) Assignee: FEINTOOL INTERNATIONAL HOLDING AG, Lyss (CH)

( * ) Notice: Subject to any disclaimer, the term of this patent is extended or adjusted under 35 U.S.C. 154(b) by 341 days.

(21) Appl. No.: 14/485,978

(22) Filed: Sep. 15, 2014

(65) Prior Publication Data

US 2015/0158073 A1  Jun. 11, 2015

(30) Foreign Application Priority Data

Sep. 14, 2013  (EP) ..................................... 13004500

(51) Int. Cl.
| B21D 55/00 | (2006.01) |
| B21D 45/06 | (2006.01) |
| B21D 28/16 | (2006.01) |
| B21D 28/20 | (2006.01) |
| F16P 7/02 | (2006.01) |
| B30B 15/28 | (2006.01) |

(52) U.S. Cl.
CPC ............... *B21D 55/00* (2013.01); *B21D 28/16* (2013.01); *B21D 28/20* (2013.01); *B21D 45/06* (2013.01); *B30B 15/285* (2013.01); *F16P 7/02* (2013.01)

(58) Field of Classification Search
CPC ............... F16P 7/00; F16P 7/02; B21D 28/04; B21D 28/16; B21D 28/20; B21D 45/06; B21D 55/00; B30B 15/28; B30B 15/285
USPC ................................................. 72/3, 4; 83/55
See application file for complete search history.

(56) References Cited

U.S. PATENT DOCUMENTS

| 3,568,553 A | 3/1971 | Wanner et al. |
| 3,991,639 A | 11/1976 | Pfeifer |

(Continued)

FOREIGN PATENT DOCUMENTS

| DE | 69 17 177 | 12/1970 |
| DE | 24 19 390 | 9/1983 |
| EP | 2 258 496 | 12/2010 |

*Primary Examiner* — Jimmy T Nguyen
*Assistant Examiner* — Gregory Swiatocha
(74) *Attorney, Agent, or Firm* — Norris McLaughlin & Marcus, P.A.

(57) ABSTRACT

An exchangeable plate is suspended on a top plate and held in a lower end position without force by a hydraulic clamps. In an upper end position, it is connected with force fit to, and re-detached from, the top plate as a function of a stripping operation of a scrap web from a V-ring pressure plate. The exchangeable plate is transferred from the lower into the upper end position by movement of a ram, and transferred from the upper into the lower end position by gravity. A sensing distance, adapted to the brake path of the drive system, is provided between the top plate and the exchangeable plate. A sensing device in the V-ring pressure plate outputs a signal to the computer for stopping the drive system and deactivating the hydraulic system. A. sensor detects premature movement of a pressure plate in the exchangeable plate.

18 Claims, 11 Drawing Sheets

(56) References Cited

U.S. PATENT DOCUMENTS 4,791,803 A * 12/1988 Broquet ................ B21D 37/04
                                                                                   72/355.4
8,113,111 B2 * 2/2012 Schaltegger ........... B21D 55/00
                                                                                   100/257

* cited by examiner

DEVICE AND METHOD FOR PREVENTING A TOOL FROM BREAKING WHEN FINE BLANKING AND/OR FORMING A WORKPIECE

BACKGROUND OF THE INVENTION

The invention relates to a device and a method for preventing a tool from breaking during fine blanking and/or forming in a press. A device for protecting a tool set of a hydraulic fine blanking press is known from DE 24 19 390 C2, in which a ram of a press can be lifted using quick-action cylinder-piston units and a working stroke pressure unit. A sensing gap exists in the press between the ram driving element and a driven ram part. The sensing gap is maintained when a pressure means approaches. The gap closes when a higher pressure load is applied to the parts forming the gap. The state of the sensing gap is monitored with a feeler and with a limit switch until the ram has caused the tools to approach each other to an extent where a proper start of the working stroke is reached. The sensing gap is formed between the ram and the end faces of the piston rods of the quick-action pistons. A pressure means is applied to the sensing gap in sensing cylinders in the ram. The sensing pistons in each case are seated against a partial surface of these end faces.

In this known protective device, the sensing gap in front of the quick-action cylinder-piston unit is associated with the ram and is connected upstream of the ram. This protective device is activated when the sensing gap closes due to an increased pressure load.

It has the disadvantage that stamping scrap, parts or foreign objects in the tool cannot be detected, and consequently damage to the tool cannot be prevented.

DE 69 17 177 U discloses another solution for protecting tools on presses for processing a blank. Two switches, between a first tool moved by the main piston and a second tool that is rigid with the press frame, are actuated in a predetermined sequence so as to interrupt the working stroke when the actuating sequence is reversed. An element is provided, which is used to attach the first tool and can be axially displaced in relation to the main piston. The element is held a small distance in front of the main piston by an elastically yielding means during the working stroke. A first limit switch, which can be set to the target height of the blank to be processed, is actuated by a stop when the piston has traveled a portion of the working stroke thereof that is predetermined by the setting of the first limit switch. A second limit switch is actuated by a further stop when the element has been pushed back by the small distance onto the piston due to impingement of the blank or a foreign object on the second tool.

The element is designed as a lower tool clamping table, which rests on a cylinder. The cylinder together with the main piston, encloses an annular pressure chamber connected to a pressure means line. A blocking means is located in the course of the pressure means line which allows sufficient compressed air to be admitted into the annular chamber, so that the table is practically located in a floating position in front of the piston during the working stroke.

This known solution has the drawback that, in addition to the hydraulic system, a second separate system is required, which operates with compressed air. It thus entails considerable switching and design complexity. In addition, after a foreign object has been detected, there is no option to dissipate the kinetic energy of the drive system.

The prior art from which the present invention proceeds is described in EP 2 258 496 A1, which relates to a device and to a method for preventing a tool, composed of an upper part and a lower part, from breaking during fine blanking and/or forming in a press. The known device comprises a main cylinder, which is disposed in the tine blanking head and in which a V-ring piston located on the stroke axis and multiple V-ring pins disposed coaxially to the stroke axis are accommodated. The V-ring pins are axially guided in a main plate closing the main cylinder and are supported on a V-ring pressure plate. The main cylinder is held in the head piece of the press and is closed in a pressure-tight manner by a V-ring cover. The fine blanking head is connected to a hydraulic system for generating pressures acting on the tool by way of valves that can be actuated by a computer.

A sensing piston is provided between the V-ring piston and the V-ring pin. The piston forms an axially displaceable structure together with the V-ring piston on the one hand, and together with the V-ring pin and the V-ring pressure plate on the other hand. The V-ring piston is associated with a pressure chamber that can be acted on by a preload pressure of the hydraulic system and with a pressure chamber that can be acted on by a sensing piston pressure between the V-ring piston and the sensing piston. The sensing piston is associated with a further pressure chamber that can be acted on by a pressure differential. The pressure chambers in each ease are connected via a connection in the V-ring cover to the hydraulic system for acting on the V-ring piston and the sensing piston counter to the operative direction of the preload pressure.

Moreover, a sensing table is provided, which is held in a suspended and weight-compensated manner at a defined sensing distance by the main plate counter to a clamping means engaging on the main plate. A sensor is associated with the sensing distance, which forwards a signal to the computer to immediately stop the press so as to protect the upper tool part when the sensing distance changes.

This known prior art has the drawback that the sensing table represents an additional component, which results in an increase of the mass to be moved, and thus in reduced sensitivity of the sensing device. By arranging the sensing table below the main plate, moreover the distance of the measuring point for ascertaining stamping scrap, parts that were left behind or faulty adjustments in the tool installation height from top dead center is increased. The result is a higher ram speed, which reduces the sensitivity of the sensing process.

SUMMARY OF THE INVENTION

The invention relates to a device for preventing a tool from breaking during fine blanking and/or forming in a press. The device includes a ram, which is driven by a drive system and carries out a stroke movement between top dead center (TDC) and bottom dead center (BDC). A fine blanking head is disposed above the ram and has a main cylinder in which a V-ring piston, located on the stroke axis, is accommodated. The V-ring piston is associated with multiple V-ring pressure pins that are disposed coaxially to the stroke axis, that are axially guided in a top plate attached to the main cylinder, and that are supported on a V-ring pressure plate. The V-ring pressure plate is associated with the top plate. Together with the V-ring piston and the V-ring pressure pin, they form an axially displaceable structure for the cutting, forming and stripping operation. The fine blanking head is connected to a hydraulic system for generating pressures acting on the tool by way of valves that can be controlled by a computer.

The invention further relates to a method for preventing a tool from breaking during fine blanking and/or forming in a press driven by a drive system via a modified toggle lever. The V-ring pistons, V-ring pressure pins and V-ring pressure plate, guided in the main cylinder and the top plate of the fine blanking head, can be acted on by a controllable pressure from a hydraulic system for applying a V-ring force and a stripping force. The individual pressures are actuated by way of valves that are set by a computer.

It is an object of the invention to provide an improved solution for preventing a tool from breaking when fine blanking and/or forming a workpiece on a press. A measuring point of this solution is closer to top dead center, has a short sensing path, and also allows greater sensitivity during sensing.

The solution according to the invention is based on the discovery that a separate sensing table can be dispensed with by adapting the sensing path for detecting stamping scrap, parts, other foreign objects or faulty settings in the tool installation height as a function of the brake path and by providing the sensing function directly in the pressure plate of the fine blanking head.

The solution is achieved by providing the top plate with hydraulic clamping means for holding, and with hydraulic guide means for guiding, an exchangeable plate that is suspended on the top plate. The exchangeable plate is held in a lower end position without force with respect to the top plate; and is held in an upper end position to the top plate. The exchangeable plate is connectable with force fit to and re-detachable from the top plate as a function of the stripping operation of the scrap web from the V-ring pressure plate. The exchangeable plate can be transferred from the lower into the upper end position by a movement of the ram and from the upper into the lower end position due to gravity. A sensing distance that is adapted to the brake path of the drive system is provided between the top plate and the exchangeable plate. The sensing distance is associated with a sensing device, which is disposed in the V-ring pressure plate and the top plate and which outputs a signal to the computer for stopping the drive system and for deactivating the hydraulic system via a sensor. The sensor is disposed in the top plate in the event of a premature movement of a pressure plate that is disposed in the exchangeable plate.

According to a preferred embodiment of the invention, the hydraulic clamping means are connected to a shared feed line via channels, which are provided separately in the top plate in each case. The feed line is connected to a high-pressure line of the hydraulic system of the fine blanking head via a valve that is actuated by, the computer for establishing or releasing the force fit between the top plate and the exchangeable plate, whereby it is ensured that all clamping means can be clamped or released simultaneously.

Due to the use of the hydraulic damping means, which are clamped and released again during every stamping operation, a hydraulic sensing piston according to the prior art can be dispensed with.

The hydraulic clamping means are block cylinders which act on one side and have a stroke that is adapted to the sensing distance and a clamping pressure of 270 bar.

According to a further preferred embodiment of the device according to the invention, the hydraulic guide means are connected to a shared feed line via channels provided separately in the top plate. The feed line is connected to a low-pressure line of the hydraulic system of the fine blanking head via a valve that is actuated by the computer for opening and closing.

So as to accommodate and guide the exchangeable plate on the top plate, the exchangeable plate includes guide means for stabilizing the exchangeable plate in the X and Y directions during an idle stroke into the upper end position and when returning into the lower end position. This design ensures, in a simple manner, that the exchangeable plate cannot slide away laterally during the idle stroke.

Screw-in cylinders having an operating pressure of approximately 60 bar and a considerably larger stroke travel compared to the sensing distance have been successfully applied as hydraulic guide means, so that guidance of the exchangeable plate is ensured at all times.

It is further advantageous that the exchangeable plate has a sandwich design, the upper part of which is made of steel and the lower part of which is made of aluminum. The upper part is provided with grooves in which the clamping means of the top plate engage. The lower part has grooves for attaching the upper tool part. The sandwich design allows a lightweight construction, while also providing high strength and stability of the upper part for the clamping operation.

In a further advantageous embodiment of the invention, the V-ring pressure plate has a recess that is provided parallel to the stroke axis for accommodating a spring-loaded sensing pin. One end of the pin is seated on the exchangeable plate and follows the movement of the exchangeable plate during the idle stroke of the same. The other end of the pin carries a measuring disk for detecting the movement of the exchangeable plate and of the V-ring pressure plate. The disk is associated with a sensor that is disposed in a horizontal recess in the top plate and detects the stroke movement of the measuring disk generated by the exchangeable plate into the upper end position of the exchangeable plate. The sensor outputs a signal to the computer for establishing the force fit between the top plate and the exchangeable plate by clamping the clamping means as a result of actuation of the valve for the activation of high pressure from the hydraulic system, when a distance dimension corresponding to the upper end position has been reached between the measuring disk and the sensor. The force fit between the top plate and the exchangeable plate is released by a signal from the sensor to the computer for deactivating the high pressure from the hydraulic system as soon as the measuring disk has once again reached the distance dimension during the return movement thereof, as part of the stripping process.

In an advantageous further embodiment of the invention, a non-contact displacement measuring sensor is used, preferably an inductive distance sensor having a measuring range of 4 mm. The inductive distance sensor detects the positions of the measuring disk, which correspond to the position of the exchangeable plate during the idle stroke thereof into the upper end position and during the return movement of the same. Other non-contact path sensors, such as capacitive, magneto-resistive, confocal-chromatic sensors or eddy current sensors are intended to be covered by the invention.

According to a further preferred embodiment of the device according to the invention, the pressure chamber for the main cylinder is formed in the head piece of the fine blanking head, which is connected via a connection on the head piece to a pressure line of the hydraulic system. The pressure chamber can be acted on by a preload pressure by a valve which is located in the pressure line and actuated by the computer, and can be switched for depressurization.

According to a further preferred embodiment of the invention, a first pressure chamber and/or a second pressure chamber associated in each case with the V-ring piston are provided for generating, the V-ring force. The first and second pressure chambers are provided for generating the stripping force, in which the chambers act in the same direction. The pressure chambers for the V-ring force and for the stripping force are in each case connected, by way of a channel provided in the main cylinder and by way of a feed line, to the high-pressure line of the hydraulic system via a proportional valve that is located in the feed line and actuated by the computer.

In a further advantageous embodiment of the device according to the invention, the pressure chamber associated with the V-ring piston is located beneath the pressure chamber of the main cylinder, allowing for a compact design of the head piece device.

It is further advantageous that the top plate is disposed in a torsion-proof manner, so as to be axially displaceable with the main cylinder as a result of guide pins that are guided axially parallel to the stroke axis in boreholes of the head piece.

The object is further achieved in that a sensing distance adapted to the brake path of the drive system is set between the top plate and an exchangeable plate that is guided without force on the top plate. The change of the sensing distance is detected by a sensing device and a sensor as a result of a ram-dependent premature movement of a pressure plate disposed in the exchangeable plate, converted into a signal, and forwarded to the computer so as to immediately stop the drive system and deactivate the hydraulic system.

The method according to the invention takes place in particular in the following preferred steps:

a) detecting the position of the V-ring pressure plate in a lower end stop by way of a spring-loaded sensing pin, a sensor and a sensing device including a measuring disk, and calibrating this position as the zero point in the computer;

b) coupling the exchangeable plate including the pressure plate to the top plate carrying the V-ring pressure plate, pressing the sensing pin onto the pressure plate, detecting this position as the lower end position of the exchangeable plate by way of the measuring disk, and providing this position to the computer as a comparison position;

c) carrying out a stroke movement of the exchangeable plate from the lower end position into an upper end position on the top plate by way of the ram of the toggle lever;

d) detecting the stroke positions of the pressure plate during the stroke movement of the exchangeable plate by way of the measuring disk, and deactivating the drive system and the hydraulic, system when the comparison of the current position determined by the sensing device to the comparison position after step b) by way of the computer determines a premature movement of the pressure plate;

e) detecting the upper end position of the exchangeable plate by way of the measuring disk, and outputting a signal via the sensor to the computer for activating the hydraulic system for the hydraulic clamping means of the top plate, provided that the measuring disk has not detected a premature movement of the pressure plate;

f) establishing a force fit between the top plate and the exchangeable plate in the upper end position by way of the hydraulic clamping means on the top plate using a holding pressure from the hydraulic system, and displacing the V-ring pressure plate in the direction of TDC;

g) carrying out a pressure application on the V-ring piston for stripping the scrap web with the V-ring pressure plate in the direction of BDC;

h) holding the top plate and exchangeable plate in a force-fit state until the measuring disk detects the end of the stripping process and the sensor outputs a signal to the computer for releasing the exchangeable plate;

i) releasing the force-fit connection between the top plate and the exchangeable plate by deactivating the pressure of the hydraulic system acting on the hydraulic clamping means via the computer, and returning the released exchangeable plate to the lower end position thereof by gravity; and j) repeating step sequences a) to c) and e) to h), provided the sensing device has not detected a premature movement of the exchangeable plate after step d).

According to a further preferred embodiment of the method according to the invention, the preload pressure for the V-ring piston is set to a high pressure of approximately 60 to 270 bar.

In a preferred embodiment, the method according to the invention moreover provides setting the stripping pressure to a low pressure of approximately 60 bar;

the holding pressure for the clamping means to a pressure that generates a holding force considerably above the stripping force; and the pressure for the guide means of the exchangeable plate to a low pressure of approximately 60 bar.

Further advantages and details of the invention will be apparent from the following description with reference to the accompanying drawings.

DETAILED DESCRIPTION OF THE INVENTION

Figure 1:
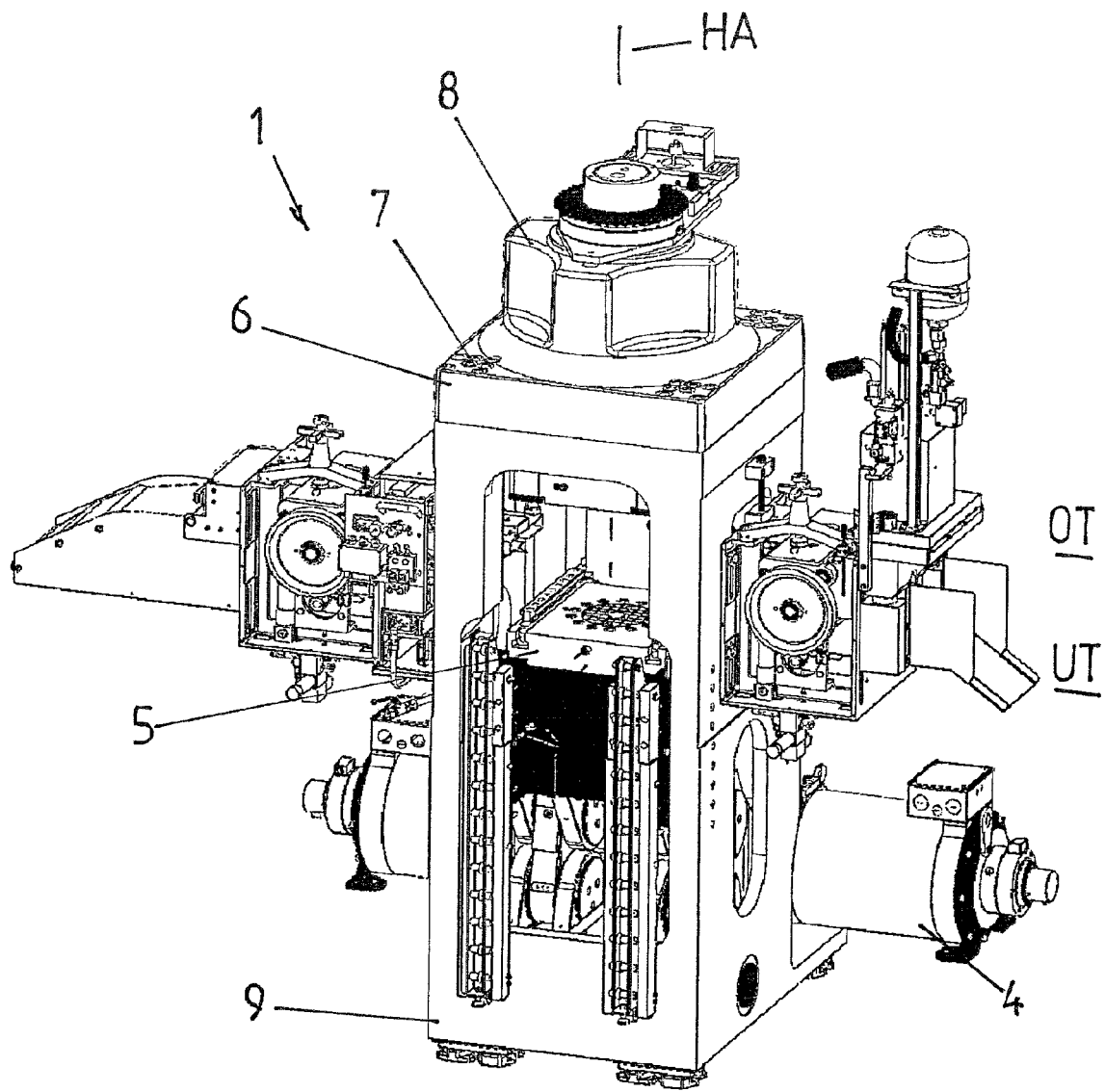
FIG. 1 shows a perspective illustration of the press including a device according to the invention mounted in the head piece of the press.
Figure 2A:
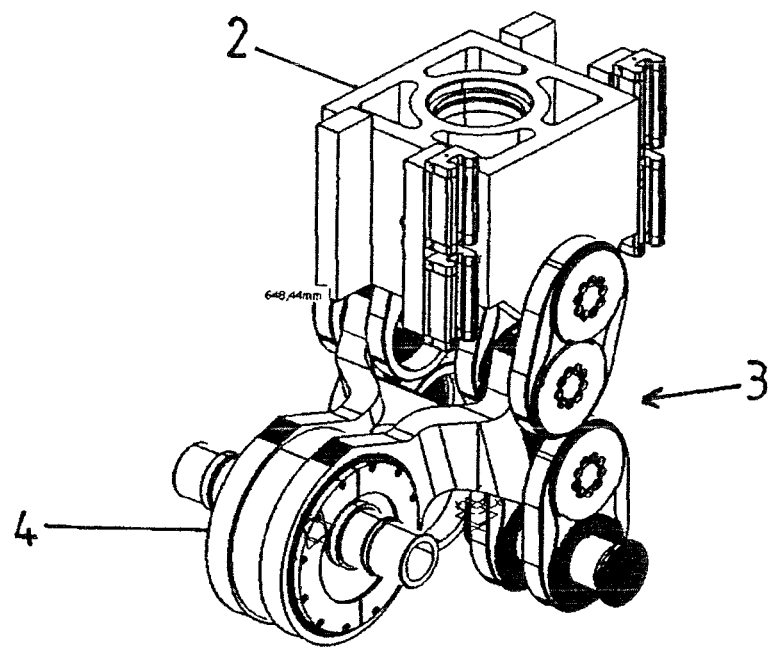
FIGS. 2a and 2b show perspective detail views of the ram assembly and of the drive system at the foot of the press.
Figure 2B:
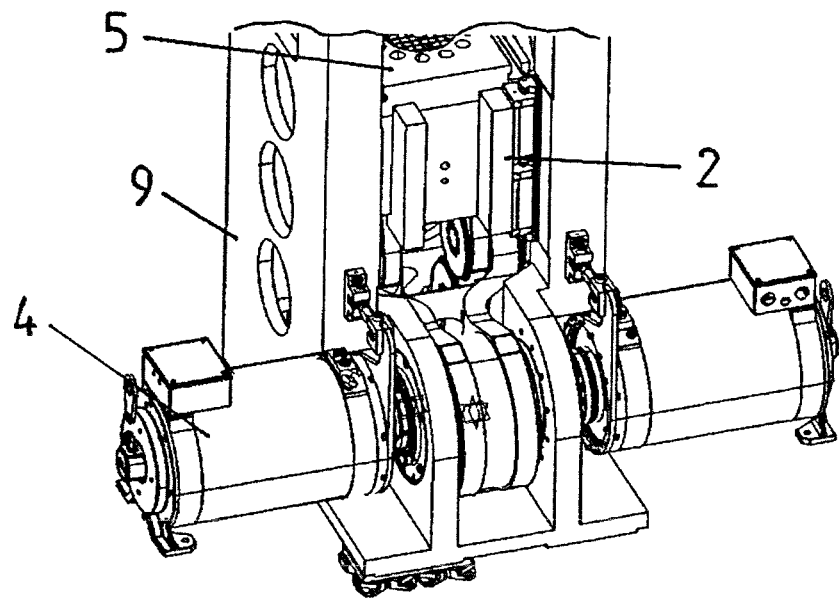

FIGS. 1, 2a and 2b show perspective illustrations of a fine blanking press 1 including a ram 2 and a modified toggle lever 3, which is driven by a drive system 4. The ram 2 supports a table plate 5 and carries out a stroke movement on the stroke axis HA in the direction of the head piece 6 of the press 1. The line blanking head 8, which is disposed in alignment with the stroke axis HA, is located in the head piece 6 of the press. The head piece 6 is force-fit to the press frame 9 by way of clamping screws 7.

The drive system 4 is designed to operate with a constant motor speed, variable motor speed or alternating direction of rotation and with a short brake path, which is a requirement for immediate stoppage so as to prevent the tool from breaking. The brake path of the drive system is in the range of 2 mm for the torque motor used here, for example.

A one-sided pendulum stroke allows the drive to be stopped in a targeted manner when the tool is open, and the opening of the tool to be freely selected, so that safety is increased for clearing the tool.

Figure 3:
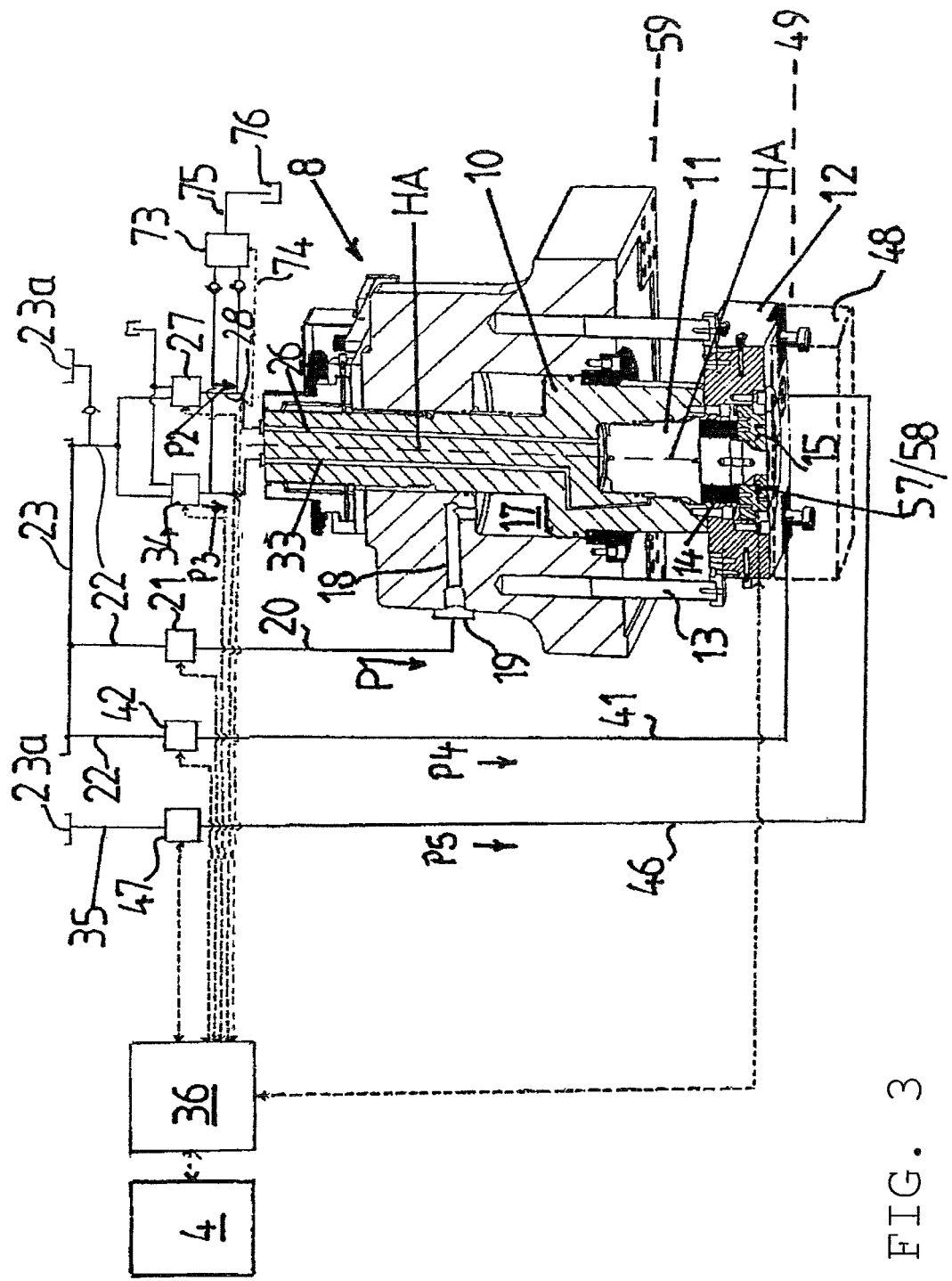
FIG. 3 shows a perspective sectional view of the device according to the invention in the forcelessly suspended state.
Figure 4:
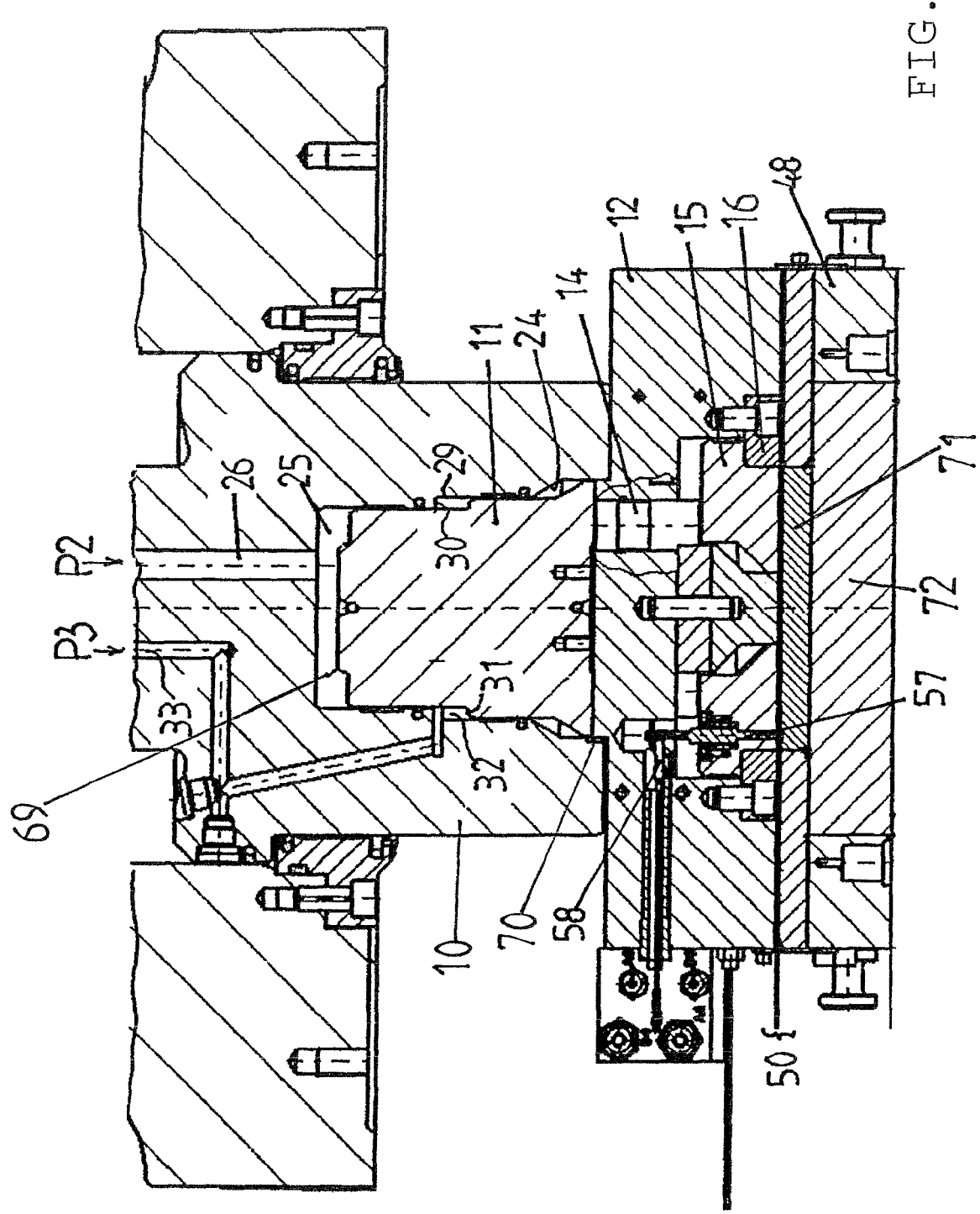
FIG. 4 shows a sectional view of the device according to the invention.

FIGS. 3 and 4 show the device according to the invention, which is integrated into the fine blanking head 8. The device according to the invention includes a main cylinder 10, which is associated with the fine blanking head 8 and which is axially displaceably and lockably guided in the head piece 6. Also included is a V-ring piston 11, which in turn is disposed in the main cylinder 10 so as to be axially displaceable on the stroke axis HA. A top plate 12 is attached to the end face of the main cylinder 10 and is held coaxially on the head piece 6 by guide pins 13 that can be inserted into the head piece 6 so as to be axially displaceable with respect to the stroke axis HA together with the main cylinder 10. The V-ring piston 11 is supported on V-ring pins 14, which are disposed coaxially to the stroke axis HA. The V-ring pins 14 extend through the top plate 12 and are seated on a V-ring pressure plate 15, which is secured on the top plate 12 by a V-ring retaining ring 16.

In the head piece 6, a pressure chamber 17 is associated with the main cylinder 10. The pressure chamber is connected, by way of a channel 18 provided in the head piece 6, and via a connection 19, a feed line 20 and a controllable valve 21, to the pressure line 22 of the hydraulic system 23 for applying a hydraulic preload pressure P1 to the main cylinder 10. The preload pressure P1 acting on the main cylinder 10 during the stamping operation is 270 bar, for example.

So as to adjust the main cylinder 10, the pressure chamber 17 is depressurized by closing of the valve 21, and the main cylinder 10 is lifted hydraulically. The adjustment process corresponds to the prior art and therefore need not be described in more detail.

The V-ring piston 11, the V-ring pressure pins 14, and the V-ring pressure plate 15 together form a force-fit structure that can be axially displaced in the direction of top dead center (TDC) or bottom dead center (BDC), and that provides the V-ring forces on the tool required for cutting and; or forming.

The V-ring force is adjusted by supplying the pressure chambers 25 and/or 32 with hydraulic fluid via the valves 27 and/or 34, the pressure of which is predefined via a proportional pressure control valve 73 connected to the computer 36 by a control line 74. The stripping force is generated by the pressure chambers 25 and 32.

The proportional pressure control valve 73 is connected via a line 75 to a fluid reservoir 76 for discharging the displaced hydraulic fluid during displacement of the V-ring piston 11.

Pressure is applied to the pressure chambers 25 and/or 32 until the pressure predefined by the computer 36 has been reached at the proportional pressure control valve 73. The valves 27 and 34 are then brought into a closed center position.

During displacement, the hydraulic fluid flows via the proportional pressure control valve 31 into the fluid reservoir 76, wherein the pressure set via the computer 36 at the proportional pressure control valve 73 is maintained. The valves 27 and 34 are opened as soon as the V-ring piston 11 has reached top dead center (TDC).

During stripping, the valves 34 and 27 are moved into the pressure position, and the V-ring piston 11 is pushed back into the starting position thereof by the pressures P2 and P3. The valves 27 and 34 are designed as proportional directional control valves in the present example. The stripping pressure P2 and P3 generated in the pressure chambers 29 and 32 is 60 bar, for example.

As shown in FIG. 4, at the foot end facing the top plate 12, the main cylinder 10 includes a receiving space 24 for the axially aligned accommodation of the V-ring piston 11. Above the V-ring piston 11, the receiving space 24 forms a pressure chamber 25, which is connected, by way of a channel 26 extending in the main cylinder 10 coaxially to the stroke axis HA. The pressure chamber is connected, by way of a feed line 28, and via a controllable valve 27, to the high-pressure line 22 of the hydraulic system 23 for applying the V-ring piston pressure P2 and/or P3 to the V-ring piston 11.

On the back, the V-ring piston 11 has a shoulder 69, which ensures that hydraulic fluid remains in the pressure chamber 25 at all times when the V-ring, piston 11 strikes against the wall of the pressure chamber 25. Accordingly, the movement of the V-ring piston 11 in the direction of BDC can be triggered without delay.

A step 70 is formed on the top plate 12 so as to delimit the stroke movement of the V-ring piston 11 in the direction of BDC.

The receiving space 24 of the main cylinder 10 includes a step 30, which is directed away from the stroke axis HA and which is associated with a step 31 on the V-ring piston 11. The step 30 on the inner wall 29 of the receiving space 24 and the step 31 on the V-ring piston 11 delimit a second pressure chamber 32, which is located below the pressure chamber 25. The pressure chamber 25, by way of a channel 33 extending in the main cylinder 10 and by way of an actuatable valve 34, is supplied via a pressure line 35 of the hydraulic system 23 for applying a V-ring pressure or stripping pressure generated in the pressure chamber 32 onto the V-ring piston 11.

An exchangeable plate 48 is held suspended on the top plate 12 by way of guide pins 43a and 43b. A pressure plate 71, which is associated with the V-ring pressure plate 15, is inserted into the upper part 52 of the exchangeable plate 48. An insert ring 72 is inserted into the lower part 53 (see also FIGS. 4 and 6). Together with the V-ring pressure plate 15, the pressure plate 71 forms a vertically displaceable structure.

Figure 5A:
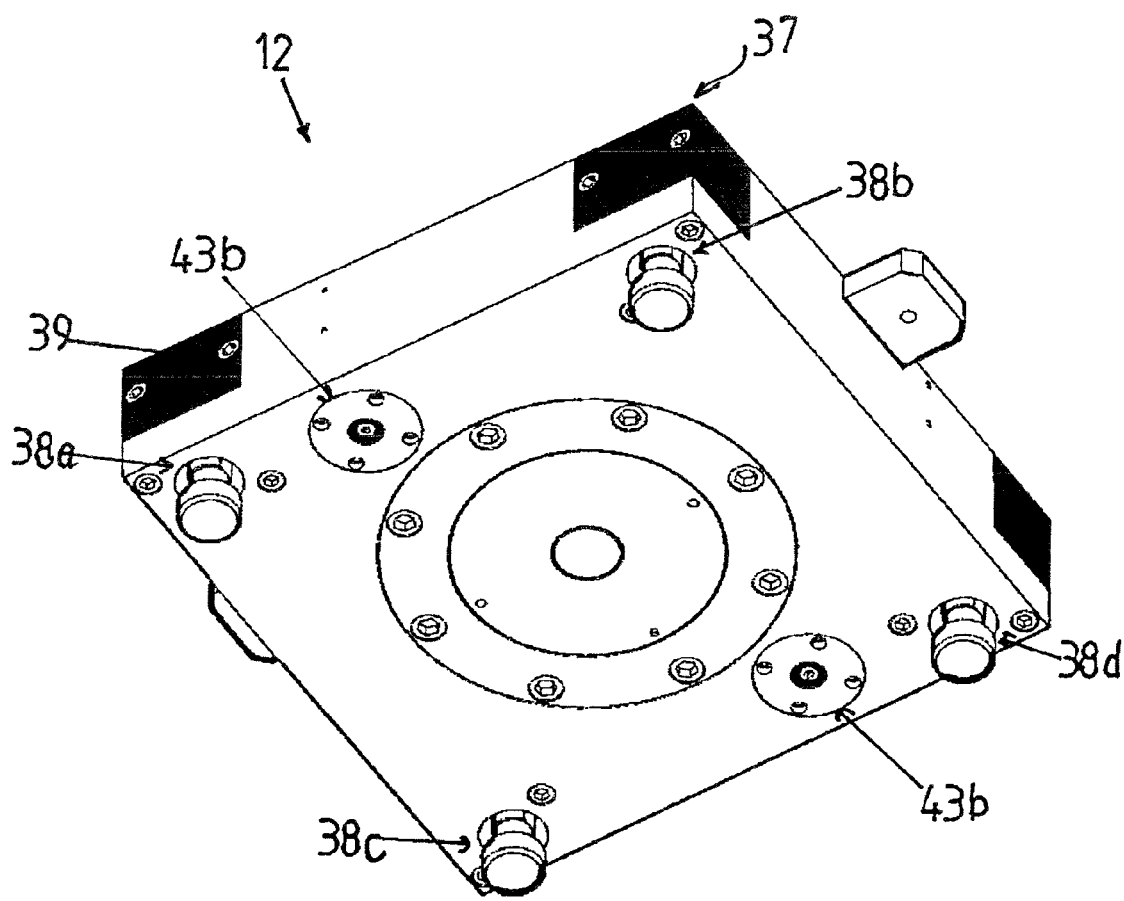
FIG. 5a shows a perspective illustration of the top plate in a bottom view.
Figure 5B:
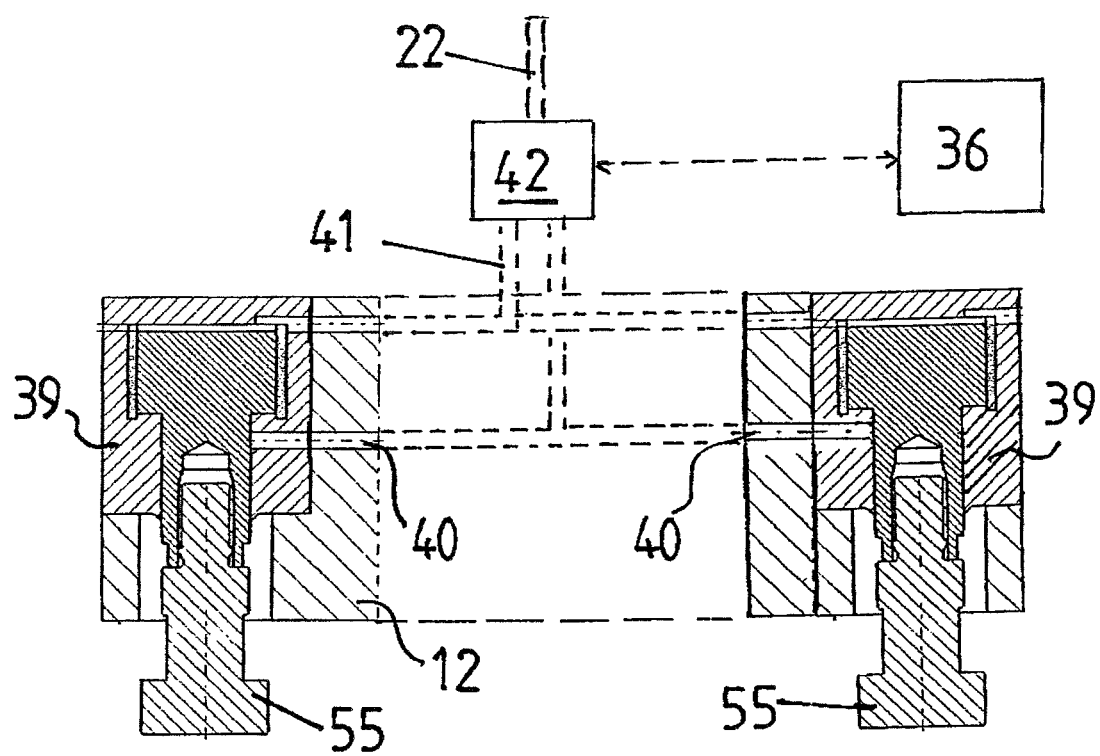
FIG. 5b shows a schematic illustration of the hydraulic clamping means in the combined state.
Figure 5C:
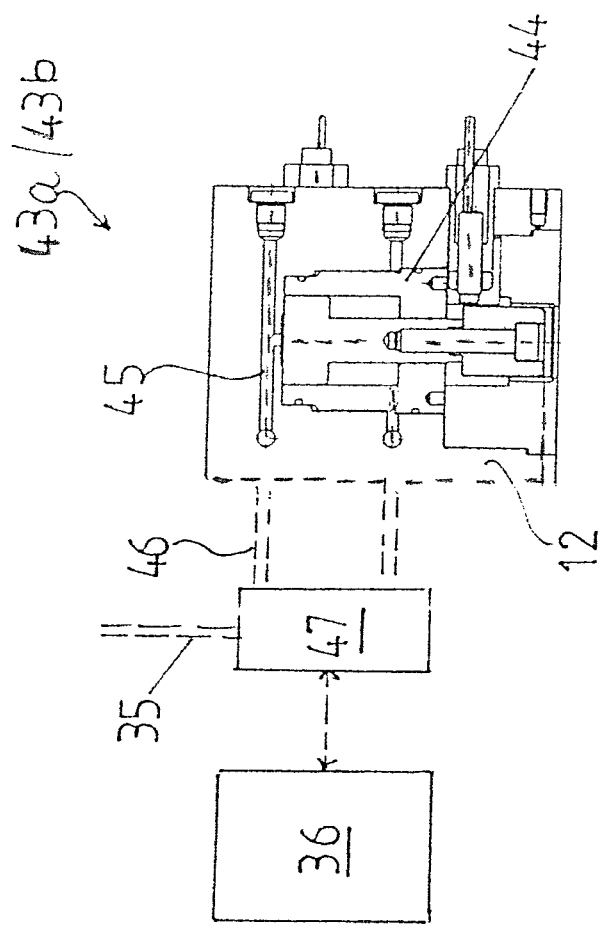
FIG. 5c shows a schematic illustration of the hydraulic guide means in the combined state.

Reference is now made to FIG. 4 in conjunction with FIGS. 5a to c, which show enlarged illustrations of the top plate 12. The top plate 12 is designed as a cuboid body. Hydraulic clamping means 38a, 38b, 38c and 38d are integrated in the corner regions 37. The hydraulic clamping means 38a, 38b, 38c and 38c are composed of block cylinders 39, one side of which can be acted on and which, by way of channels 40 extending in each case in the top plate 12, are connected to the high-pressure line 22 of the hydraulic system 23 via a shared feed line 41 and a valve 42 actuated by the computer 36. It is thus ensured that all block cylinders 38a, 38b, 38c and 38d can be simultaneously acted on by high pressure or depressurized from high pressure (see FIG. 5b). The clamping force is selected so as to be considerably greater than the stripping force.

In addition to the hydraulic clamping means, the top plate 12 includes hydraulic guide pins 43a and 43b, which are disposed diametrically opposite each other at equal distances from the center. Precise centering on the top plate 12 is thus made possible.

The hydraulic guide means 43a and 43b are composed of screw-in cylinders 44, which like the hydraulic clamping means are connected, by way of channels 45 provided in the top plate 12, via a shared feed line 46 and a valve 47 actuated by the computer 36 to the pressure line 35 of the hydraulic system 23 so as to activate or deactivate the pressure (see FIG. 5c).

The hydraulic pressure PS for guiding and centering on the top plate 12 is 60 bar, for example.

Figure 6:
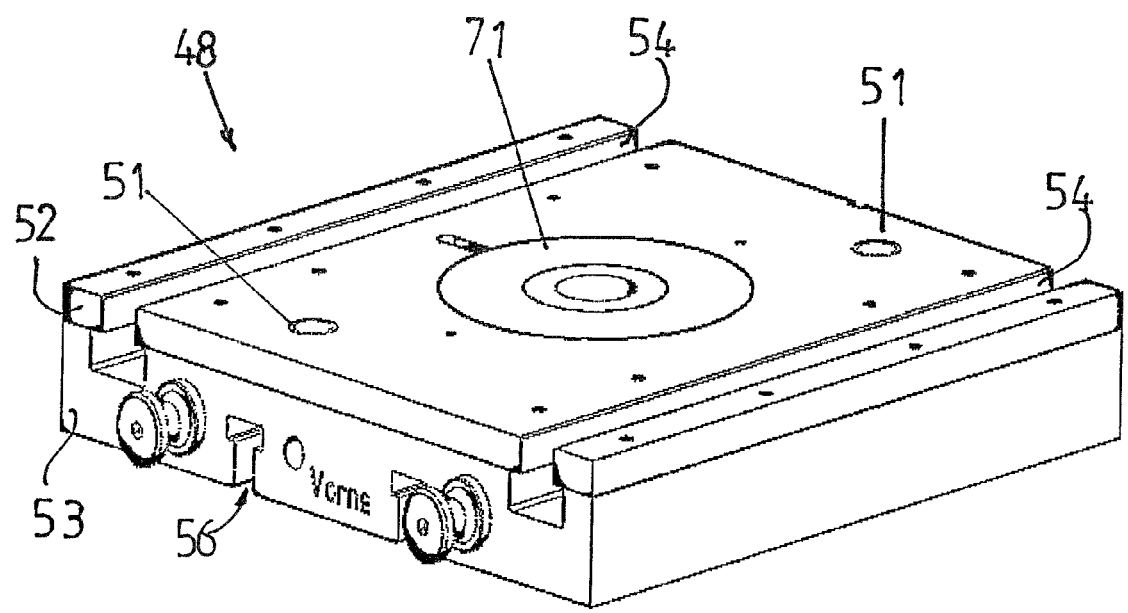
FIG. 6 shows a perspective illustration of the exchangeable plate in a top view.

FIG. 6, in conjunction with FIG. 3, shows an enlarged perspective illustration of the exchangeable plate 48. The exchangeable plate 48 is held suspended without force on the top plate 12 at a sensing distance 50 from the top plate 12 in a lower end position 49, and is guided centered on the top plate 12 by way of the hydraulic guide means 43a and 43b.

The sensing distance 50 between the top plate 12 and the exchangeable plate 48 is based on the properties of the drive system, and more particularly on the brake path of the drive system 4. In the present example, the sensing distance 50 is two millimeters.

So as to center the exchangeable plate 48 on the top plate 12, the exchangeable plate 48 is provided with guide holes 51, the locations and positions of which are matched to the positions and dimensions of the guide means 43a and 43b, so that the screw-in cylinders 44 of the top plate 12 can engage in the guide holes 51 of the exchangeable plate 48 during the stroke movement The exchangeable plate 48 has a sandwich design, including an upper part 52 made of steel and a lower part 53 made of aluminum. Grooves 54 for accommodating the clamping bolts 55 of the clamping means 38a to 38d are located in the side of the upper part 52 facing the top plate 12, in each case in alignment with the clamping means 38a and 38b, or 38c and 38d.

On the side facing away from the top plate 12, the lower part 53 likewise includes corresponding grooves 56 for attaching an upper part of a tool, which is not shown in detail.

As is also apparent from FIGS. 3 and 4, the exchangeable plate 48 assumes a forcelessly suspended lower installation position 49 and defines a sensing distance 50 between the top plate 12 and the exchangeable plate 48, the distance corresponding to the brake path of the drive system 4.

During the movement in the direction of TDC, the ram 2 moved by the toggle lever 3 by way of the drive system 4 reaches the exchangeable plate 48 and displaces the same against the top plate 12. As a result, the clamping means 38a to 38d can engage in the grooves 54. Further, as a result of the activated high pressure P4 of the hydraulic system 23, the clamping means 38a to 38d can establish a force-fit connection between the top plate 12 and the exchangeable plate 48 by way of the clamping of the clamping bolts 55 when a signal is generated by way of a sensing pin 57, which will be described in more detail hereafter, with a sensor 58. The signal is forwarded to the computer 36 for the output of a control command to the valve 42 for the purpose of activating the high pressure from the hydraulic system 23. The exchangeable plate 48 has then reached the upper end position 59 thereof, and the cutting and/or forming operation begins in the closed tool.

Figure 7A:
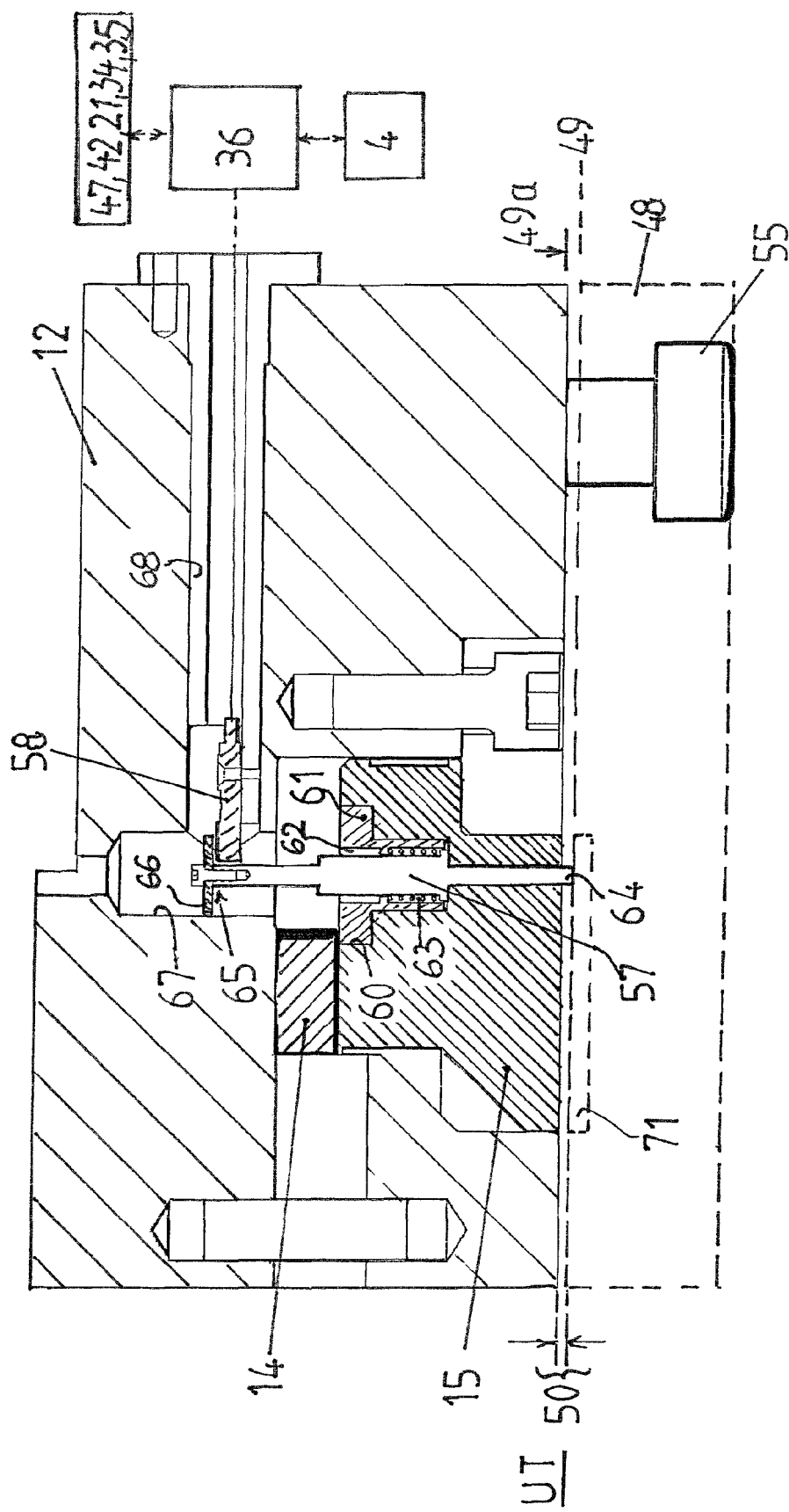
FIGS. 7a to 7c show sectional views of the sensing and sensor assembly in the lower and upper end positions and during the stripping operation.
Figure 7B:
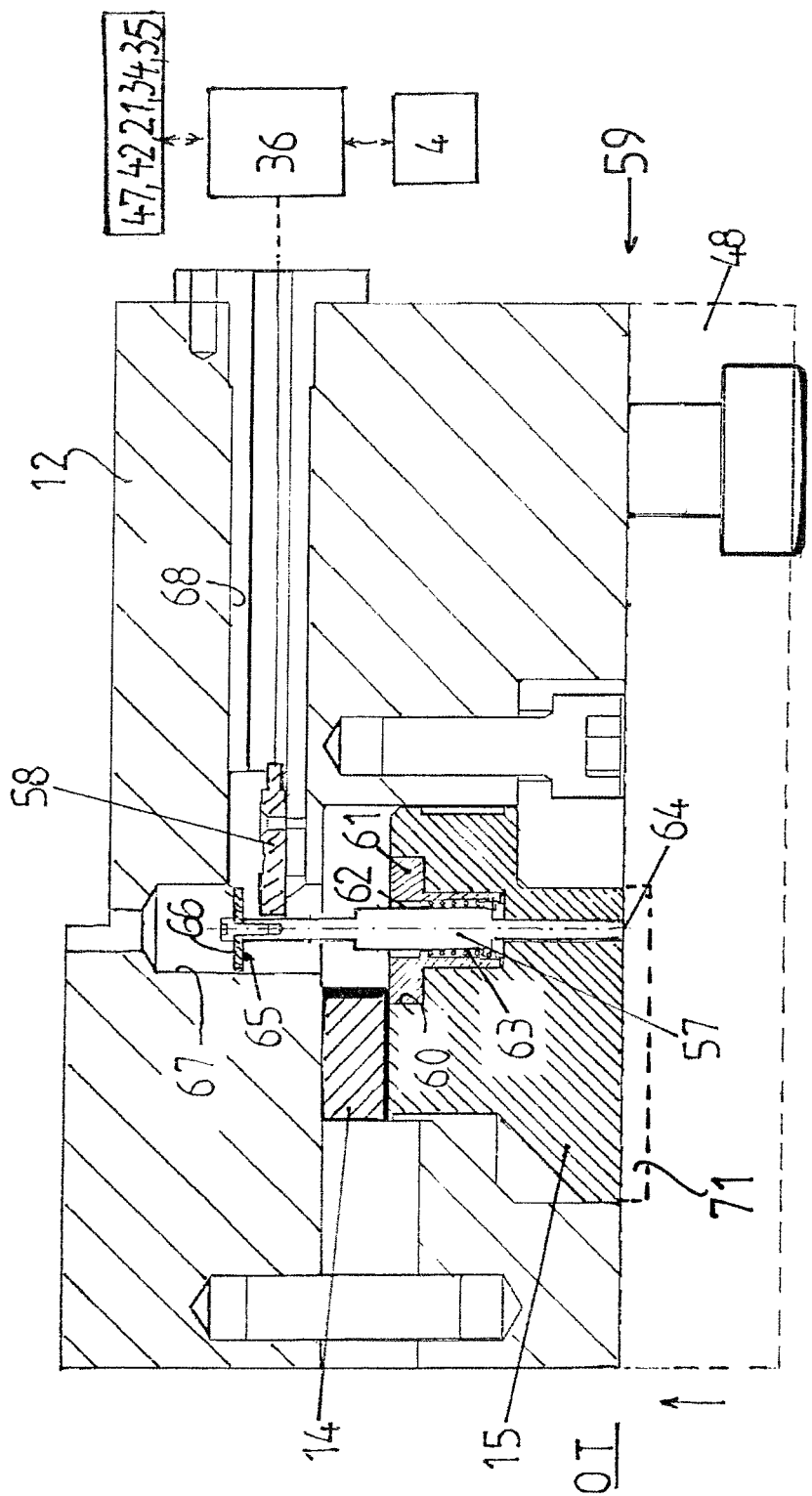
Figure 7C:
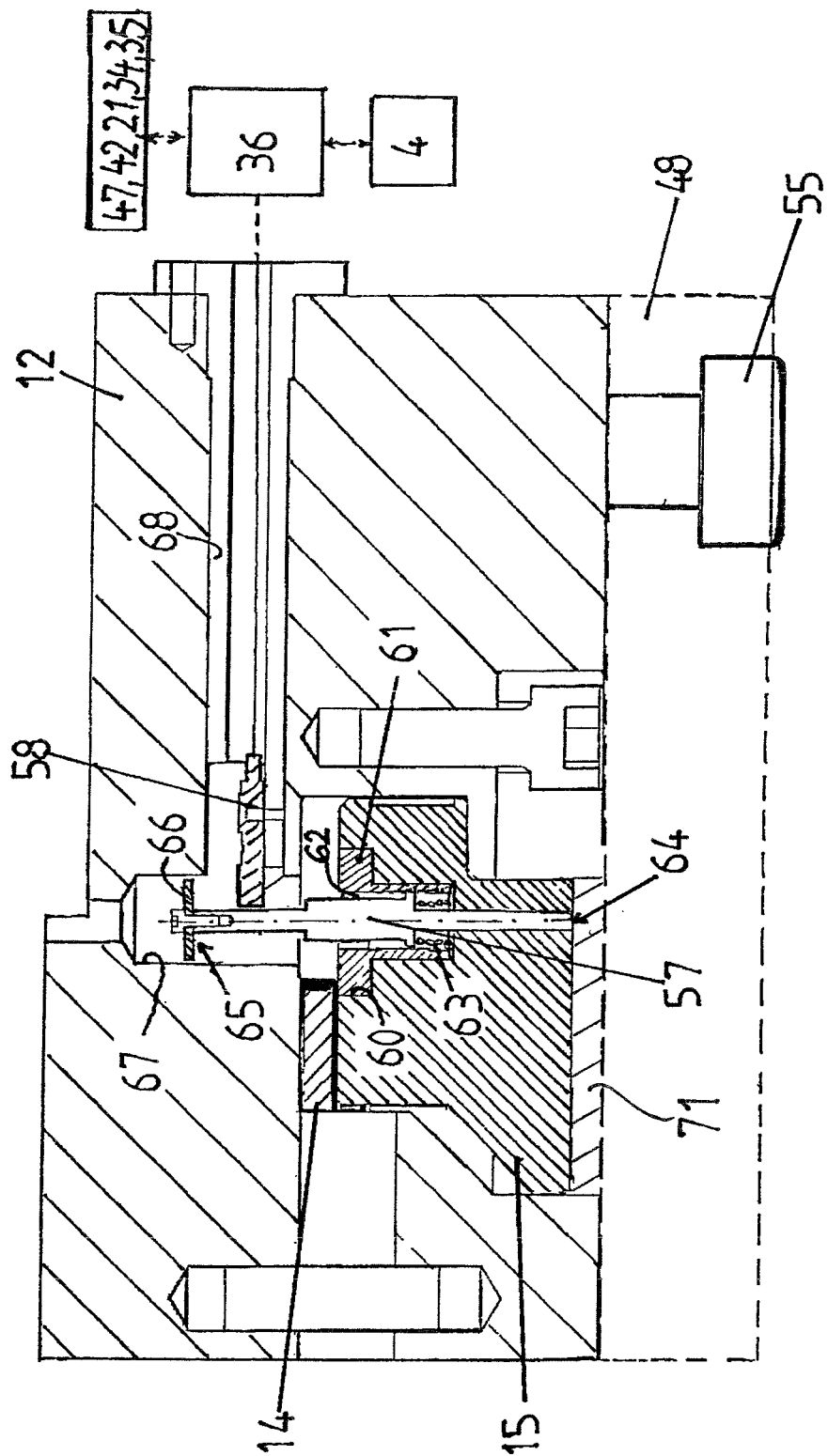

FIGS. 7a to 7c show the arrangement of the sensor 58 and of the sensing pin 57 in the top plate 12 in the lower end position 49 prior to the sensing operation, in the upper installation position 59 during the start of the fine blanking/forming operation and the displacement of the V-ring pressure plate 15, and in the situation in which the fine blanking/forming operation has been completed and the V-ring pressure plate has been displaced. The V-ring pressure plate 15 includes a receiving space 60, which is disposed coaxially to the stroke axis HU and in which the sensing pin 57 is held by a receiving bushing 61 and axially guided by a guide bushing 62.

The sensing pin 57 is supported against a compression spring 63 that is held in the receiving space 60 and that maintains the head 64 of the sensing pin 57 at a defined sensing distance 50 with respect to the pressure plate 71 of the exchangeable plate 48. In the present example, the sensing distance 50 is 2 mm. At the foot 65 located opposite the head 64, the sensing pin 57 carries a measuring disk 66, wherein the foot 65 and the measuring disk 66 extend into a receiving space 67 in the top plate 12 located in vertical alignment with the receiving space 60. This receiving space 67 is dimensioned so that the sensing pin 57, together with the measuring disk 66, are able to follow the vertical movement of the pressure plate 71.

The sensor 58, which is situated in a recess 68 in the top plate 12 in the horizontal position and attached in a calibrated measuring position with respect to the measuring disk 66, is associated with the measuring disk 66. The sensor 58 is designed as a displacement measuring sensor, such as an inductive distance sensor, and is connected to the computer 36, which processes the signals of the sensor 58 and actuates the appropriate valves of the hydraulic system 23 (see FIG. 7a).

If the sensor 58 detects a premature movement of the pressure plate 71 as compared to the calibrated measuring position, which may be caused by a stamped part that was left behind or a faulty adjustment of the tool installation height, for example, the sensor issues a signal to the computer 36, which triggers the immediate stoppage of the drive system 4.

FIG. 7b shows the state of the force fit connection between the top plate 12 and the exchangeable plate 48. The sensing pin 57 has carried out a corresponding vertical movement against the compression spring 63, and the measuring disk 66 has moved away from the sensor 58 by at least the sensing distance 50. The sensor 58 generates a signal that is forwarded to the computer 36, which actuates the appropriate valve 42 for activating, the high pressure from the hydraulic system 23. The clamping means 38a to 38d are operated. The top plate 12 and the exchangeable plate 48 are in a force-fit connection, which is maintained until the stripping operation has been completed.

FIG. 7c shows the situation at the end of the fine blanking operation. The pressure plate 71 and the V-ring pressure plate 15 were displaced accordingly in the direction of TDC. The measuring disk 66 follows the upward movement of the sensing head 64 and has moved out of the measuring range of the sensor 58 in this process. The stripping step begins.

During stripping, the V-ring pressure plate 15 and the pressure plate 71 move in the direction of BDC. The stripping step is completed when the V-ring pressure plate 15 and the pressure plate 71 have again reached the positions shown in FIG. 7b.

During the stripping operation, the V-ring pressure plate 15 and the pressure plate 71 move in the direction of BDC, and the measuring disk 66 returns into the measuring range of the sensor 58, which again generates a signal that is supplied to the computer 36 so as to release the clamping means 38a to 38d by deactivating the high pressure from the hydraulic system 23 via the valve 42. The force fit connection between the top plate 12 and the exchangeable plate 48 is removed. The exchangeable plate 48, together with the upper part of the tool coupled thereto, moves back into the lower end position 49 as a result of the weight of the plate due to gravity.

The hydraulic system 23 is composed of a high-pressure hue 22 and a low-pressure line 23a, which are pressurized to a pressure of 270 and 60 bar, respectively, by a pressure source, which is not shown. The feed line 20 for the pressure chamber 17 of the main cylinder 10, the feed line 22 for the pressure chamber 25 of the V-ring piston 11, and the feed line 41 for the hydraulic clamping means 38a to 38d are connected to the pressure line 22 by way of the appropriate controllable valves 21, 27 and 42. The hydraulic system 23 also includes a low-pressure network, which is connected to the low-pressure line 23a for the pressure chambers 25 and 32 for stripping, and to the feed line 46 for the guide pins 43a and 43b, by way of the valves 34 and 47.

The method according to the invention will be described in more detail hereafter.

A sensing distance 4, which is adapted to the brake path of the drive system 4, is set between the top plate 12 and an exchangeable plate 48 guided without force on the top plate 12. The change in this distance is detected by a sensor 58 as a result of a ram-dependent premature movement of the exchangeable plate 48, converted into a signal, and forwarded to the computer 56 so as to immediately stop the drive system 4 and deactivate the hydraulic system 23.

The method takes place as follows:

a) detecting the position of the V-ring pressure plate 15 in a lower end stop 49a by way of a spring-loaded sensing pin 57, a sensor 58 and a sensing device including a measuring disk 66, and calibrating this position as the zero point in the computer 36;

b) coupling an exchangeable plate 48 including a pressure plate 71 to the top plate 12 carrying the V-ring pressure plate 15, pressing the sensing pin 57 onto the pressure plate 71, detecting this position as a lower end position 49 of the exchangeable plate 48 by way of the measuring disk 66, and providing this position to the computer 36 as a comparison position;

c) carrying out a stroke movement of the exchangeable plate 48 from the lower end position 49 into an upper end position 59 on the top plate 12 by way of the ram 2 of the toggle lever 3;

d) detecting the stroke positions of the pressure plate 71 during the stroke movement of the exchangeable plate by way of the measuring disk 66, and deactivating the drive system 4 and the hydraulic system when the comparison of the current position determined by the sensing device to the comparison position after step b) by way of the computer 36 determines a premature movement of the pressure plate 71;

e) detecting the upper end position 59 of the exchangeable plate 48 by way of the measuring disk 66, and outputting a signal to the computer 36 for activating the hydraulic system 23 for the hydraulic clamping means 38a to 38b of the top plate 12, provided that the measuring disk 66 has not detected a premature movement of the pressure plate 71;

f) establishing a force-fit connection between the top plate 12 and the exchangeable plate 48 in the upper end position 59 by way of the hydraulic clamping means 38a to 38d on the top plate 12 using a holding pressure P4 from the hydraulic system 23, and displacing the V-ring pressure plate 1 in the direction of TDC;

g) carrying out a pressure application on the V-ring pressure plate 15 in the direction of BDC for stripping the scrap web;

h) holding the top plate 12 and the exchangeable plate 48 in a force-fit state until the measuring disk 66 detects the end of the stripping operation and the sensor 58 outputs a signal to the computer 36 for releasing the exchangeable plate 48;

i) releasing the force-fit connection between the top plate 12 and the exchangeable plate 48 by deactivating the pressure of the hydraulic system 23 acting on the hydraulic clamping means 38a to 38d via the computer 36, and returning the released exchangeable plate 48 to the lower end position 49 thereof by gravity; and j) repeating step sequences a) to c) and e) to h), provided the sensing device has not detected a premature movement of the exchangeable plate 48 after step d).

If a premature movement of the exchangeable plate 48 is detected, an emergency shut-down takes place, which causes the press to be stopped immediately. An immediate stop is triggered whenever stamping scrap, parts or other foreign objects are located in the tool, since this can result in a premature change of the sensing distance 50.

The invention claimed is:

1. A device for preventing a tool from breaking during fine blanking or forming in a press that includes a ram and a fine blanking head, the ram being driven by a drive system and carrying out a stroke movement between top dead center and bottom dead center, the fine blanking head being disposed above the ram and having a main cylinder in which a V-ring piston located on a stroke axis is accommodated, the V-ring piston contacting plurality of V-ring pressure pins that are disposed coaxially to the stroke axis and axially guided in a top plate attached to the main cylinder and that are supported on a V-ring pressure plate, the V-ring pressure plate contacting the top plate, and together with the V-ring piston and the V-ring pressure pins, forming an axially displaceable structure for a cutting, forming and stripping operation, wherein the fine blanking head is connected to a hydraulic system for generating pressures acting on the tool by way of valves that can be actuated by a computer, the device comprising:

an exchangeable plate suspended from the top plate,
a sensing device disposed in the V-ring pressure plate;
a sensor disposed in the top plate;
hydraulic clamps for holding the exchangeable plate;
hydraulic guides for guiding the exchangeable plate;
wherein the exchangeable plate is held by the hydraulic clamps, in a lower end position without contact a lower surface of plate;
wherein in an upper end position the exchangeable plate can be connected to and re-detached from the lower surface of the top plate as a function of a stripping operation of a scrap web from the V-ring pressure plate;
wherein the exchangeable plate can be transferred from the lower into the upper end position by a movement of the ram and from the upper into the lower end position due to gravity;
wherein a sensing distance that is adapted to a brake path of the drive system is provided between the top plate and the exchangeable plate, the sensing distance being sensed by the sensing device, which is disposed in the V-ring pressure plate and which outputs a signal to the computer for stopping the drive system and for deactivating the hydraulic system via the sensor disposed in the top plate in the event of a premature movement of a pressure plate disposed in the exchangeable plate.

2. The device according to claim 1, wherein the hydraulic clamps are separately connected, by way of channels provided in the top plate, to a shared feed line, which is connected to the hydraulic system of the fine blanking head via a valve of the valves that is actuated by the computer for clamping or releasing the connection between the top plate and the exchangeable plate.

3. The device according to claim 1, wherein the hydraulic clamps are block cylinders having a stroke corresponding to the sensing distance.

4. The device according to claim 1, wherein the hydraulic guides are seperately connected, by way of channels provided in the top plate, to a shared feed line, which is connected to a low-pressure line of the hydraulic system of the fine blanking head via a valve of the valves that is actuated by the computer for opening and closing purposes.

5. The device according to claim 1, wherein the exchangeable plate is provided with guide holes for accommodating and guiding the hydraulic guides disposed on the top plate for stabilizing the exchangeable plate during an idle stroke into the upper end position and when returning into the lower end position.

6. The device according to claim 1, wherein the hydraulic guides are screw-in cylinders having a larger stroke travel compared to the sensing distance.

7. The device according to claim 1, wherein the exchangeable plate has a sandwich design, an upper part of which is made of steel and a lower part of which is made of aluminum, wherein the upper part is provided with grooves in which the hydraulic clamps of the top plate engage, and the lower part has grooves for attaching an upper tool part.

8. The device according to claim 1, wherein the V-ring pressure plate comprises a receiving space disposed parallel to the stroke axis for accommodating a spring-loaded sensing pin, a head of which is seated on the pressure plate of the exchangeable plate and follows the movement of the exchangeable plate during an idle stroke, and a foot of which carries a measuring disk for detecting the movement of the exchangeable plate and of the V-ring pressure plate, the disk being associated with the sensor that is disposed in a horizontal recess of the top plate and detects the stroke movement of the measuring disk generated by the exchangeable plate into the upper end position of the exchangeable plate, and outputs a signal to the computer for establishing the connection between the top plate and the exchangeable plate by way of clamping of the hydraulic clamps as a result of actuation of a valve of the valves for activation of a high pressure from the hydraulic system, when a distance dimension corresponding to a distance between the lower end position and the upper end position has been reached between the measuring disk and the sensor, wherein the connection between the top plate and the exchangeable plate is released by a signal from the sensor to the computer for deactivating the hydraulic system as soon as the measuring disk has once again reached the distance dimension during a return movement of the exchangeable plate, as part of the stripping process.

9. The device according to claim 8, wherein the sensor is a non-contact path sensor, and more particularly an inductive distance sensor.

10. The device according to claim 1, wherein a pressure chamber for the main cylinder is formed in a head piece of the fine blanking head, which is connected via a connection on the head piece and a feed line to a high-pressure line of the hydraulic system, wherein the pressure chamber can be acted on by a preload pressure by a valve of the valves, which is located in the feed line and actuated by the computer, and can be switched so as to depressurize.

11. The device according to claim 1, wherein a first pressure chamber or a second pressure chamber are provided for generating the a force on the V-ring piston, and the first pressure chamber and the second pressure chamber are provided for generating a stripping force, wherein the pressure chambers for the V-ring force and the stripping force are connected in each case, by way of channels provided axially in the main cylinder and by way of feed lines, to the hydraulic system via a valve of the valves that is actuated by the computer.

12. The device according to claim 1, wherein a pressure chamber associated with the V-ring piston is located below a pressure chamber of the main cylinder.

13. The device according to claim 1, wherein the top plate is disposed in a torsion-proof manner and so as to be axially displaceable as a result of guide pins that are guided axially parallel to the stroke axis in boreholes of the fine blanking head.

14. The device according to claim 1, wherein the ram is gearlessly connected to the drive system by way of a modified toggle lever, and wherein the toggle lever is disposed beneath the ram and the drive system is disposed at a foot side on a frame of the press.

15. A method for preventing a tool from breaking during fine blanking or forming in a press that is driven by a drive system via a modified toggle lever, comprising a ram and a fine blanking head, the ram being driven by the drive system, the fine blanking head being disposed above the ram and having a main cylinder in which a V-ring piston located on a stroke axis is accommodated, the V-ring piston contacting a plurality of V-ring pressure pins that are disposed coaxially to the stroke axis and axially guided in a top plate attached to the main cylinder and that are supported on a V-ring pressure plate, the V-ring pressure plate contacting the top plate; an exchangeable plate suspended from the top plate; hydraulic clamps holding the exchangeable plate; wherein the exchangeable plate is held by the hydraulic clamps with respect to a lower surface of the top plate, in which the V-ring piston, V-ring pressure pins and V-ring pressure plate guided in the main cylinder and the top plate of the fine blanking head are acted on by a controllable pressure from a hydraulic system for applying a V-ring force and a stripping force, wherein individual pressures are actuated by way of valves that are adjusted by a computer, the method comprising:

setting a sensing distance, which is adapted to a brake path of the drive system, between the top plate and the exchangeable plate suspended from the top plate;

detecting a change in the sensing distance by a sensing device and sensor as a result of a ram-dependent premature movement of a pressure plate disposed in the exchangeable plate, converted into a signal, and forwarded to the computer so as to immediately stop the drive system and deactivate the hydraulic system.

16. The method according to claim 15, further comprising the following steps:

a) detecting a position of the V-ring pressure plate in a lower end stop by way of a spring-loaded sensing pin, the sensor and the sensing device comprising a measuring disk, and calibrating the detected V-ring pressure plate position as a zero point in the computer;

b) coupling the exchangeable plate including the pressure plate to the top plate carrying the V-ring pressure plate, pressing the sensing pin onto the pressure plate, detecting a lower end position of the exchangeable plate by way of the measuring disk, and providing the detected lower end position to the computer as a comparison position;

c) carrying out a stroke movement of the exchangeable plate from the lower end position into an upper end position on the top plate by way of the ram of the toggle lever;
d) detecting stroke positions of the pressure plate during the stroke movement of the exchangeable plate by way of the measuring disk, and deactivating the drive system and the hydraulic system when the comparison of a current position determined by the sensing device to the comparison position after step b) by way of the computer determines a premature movement of the pressure plate;
e) detecting the upper end position of the exchangeable plate by way of the measuring disk, and outputting a signal to the computer for activating the hydraulic system for the hydraulic clamps of the top plate, provided that the measuring disk has not detected a premature movement of pressure plate;
f) establishing a connection between the lower surface of the top plate and the exchangeable plate in the upper end position by way of the hydraulic clamping means on the top plate using a holding pressure from the hydraulic system, and displacing the V-ring pressure plate in the direction of top dead center for stripping of a scrap web;
g) carrying out a pressure application on the V-ring piston in the direction of bottom dead center for stripping of the scrap web with the V-ring pressure plate;
h) holding the top plate and the exchangeable plate together until the measuring disk detects the end of the stripping operation and the sensor outputs a signal to the computer for releasing the exchangeable plate;
i) releasing the connection between the top plate and the exchangeable plate by deactivating the pressure of the hydraulic system acting on the hydraulic clamping means via the computer, and returning the released exchangeable plate to the lower end position thereof by gravity; and
j) repeating step sequences a) to c) and e) to h), when the sensing device has not detected a premature movement of the exchangeable plate after step d).

17. The method according to claim 16, wherein a retaining force, generated by way of a retaining pressure, for the connection between the top plate and the exchangeable plate is set to a value that is greater compared to a stripping force generated by the stripping pressure.

18. The method according to claim 16, wherein a preload pressure for the V-ring piston is set to a high pressure of approximately 270 bar, a stripping pressure is set to a low pressure of approximately 60 bar, a retaining pressure for the connection between the top plate and the exchangeable plate is set to approximately 270 bar, and a guide pressure for guiding the exchangeable plate with the top plate is set to approximately 60 bar.

* * * * *